United States Patent
Collings et al.

(10) Patent No.: US 8,396,163 B2
(45) Date of Patent: Mar. 12, 2013

(54) VECTOR QUANTIZATION IN WIRELESS COMMUNICATION

(75) Inventors: Iain Bruce Collings, Roseville Chase (AU); Daniel Ryan, Trondheim (NO); Jean-Marc Valin, Montreal (CA)

(73) Assignee: Commonwealth Scientific and Industrial Research Organization, Campbell, ACT (AU)

( * ) Notice: Subject to any disclaimer, the term of this patent is extended or adjusted under 35 U.S.C. 154(b) by 351 days.

(21) Appl. No.: 12/746,905

(22) PCT Filed: Sep. 18, 2009

(86) PCT No.: PCT/AU2009/001238
§ 371 (c)(1),
(2), (4) Date: Sep. 17, 2010

(87) PCT Pub. No.: WO2010/031131
PCT Pub. Date: Mar. 25, 2010

(65) Prior Publication Data
US 2011/0044400 A1 Feb. 24, 2011

(30) Foreign Application Priority Data
Sep. 18, 2008 (AU) ............................... 2008904863

(51) Int. Cl.
*H04L 27/00* (2006.01)
(52) U.S. Cl. ...................................................... 375/299
(58) Field of Classification Search .................. 375/260, 375/299, 347
See application file for complete search history.

(56) References Cited

U.S. PATENT DOCUMENTS

| 7,236,748 | B2 | 6/2007 | Li et al. |
|---|---|---|---|
| 7,239,659 | B2 | 7/2007 | Thomas et al. |
| 7,257,167 | B2 | 8/2007 | Lau |
| 7,289,770 | B2 | 10/2007 | Li et al. |
| 7,363,004 | B2 | 4/2008 | Tirkkonen |
| 2004/0242162 | A1 | 12/2004 | Lau |
| 2005/0058095 | A1 | 3/2005 | Sadri et al. |
| 2005/0265290 | A1 | 12/2005 | Hochwald et al. |

(Continued)

FOREIGN PATENT DOCUMENTS

| EP | 1 353 452 A2 | 10/2003 |
|---|---|---|
| EP | 1 445 886 A2 | 8/2004 |

(Continued)

OTHER PUBLICATIONS

Li, Qiang, et al., "Precoder Quantization of MIMO-OFDM Systems over Frequency Selective Channels," Mobile and Wireless Communications Summit, 2007 16th IST, Jul. 1-5, 2007, pp. 1-5.

(Continued)

*Primary Examiner* — Kevin Kim
(74) *Attorney, Agent, or Firm* — Kilpatrick Townsend & Stockton LLP (57) ABSTRACT

Disclosed is a method of communicating a complex vector, using one or more index bits, the method comprising quantizing the complex vector using a codebook, the codebook comprising a plurality of complex vectors mapped from real vectors that lie on a reflected simplex where the simplex is of dimension one less than twice the length of the complex vector; indexing the quantized vector to form the one or more index bits; and transmitting the index bits to the transmitter, thereby communicating the complex vector.

15 Claims, 7 Drawing Sheets

U.S. PATENT DOCUMENTS

| | | | |
|---|---|---|---|
| 2005/0286663 | A1 | 12/2005 | Poon |
| 2005/0287978 | A1 | 12/2005 | Maltsev et al. |
| 2006/0056533 | A1 | 3/2006 | Molisch et al. |
| 2006/0068718 | A1 | 3/2006 | Li et al. |
| 2006/0094435 | A1 | 5/2006 | Thomas et al. |
| 2007/0026810 | A1 | 2/2007 | Love et al. |
| 2007/0160011 | A1 | 7/2007 | Kim et al. |
| 2007/0191066 | A1* | 8/2007 | Khojastepour et al. .... 455/562.1 |
| 2007/0242770 | A1 | 10/2007 | Kim et al. |
| 2007/0268181 | A1 | 11/2007 | Howard et al. |
| 2007/0281624 | A1 | 12/2007 | Thomas et al. |
| 2008/0019457 | A1 | 1/2008 | Waters et al. |
| 2008/0037675 | A1 | 2/2008 | Lin et al. |
| 2008/0049709 | A1 | 2/2008 | Pan et al. |
| 2008/0080459 | A1 | 4/2008 | Kotecha et al. |
| 2008/0080635 | A1 | 4/2008 | Hugl et al. |
| 2008/0094281 | A1 | 4/2008 | Teng et al. |
| 2008/0101498 | A1 | 5/2008 | Han et al. |

FOREIGN PATENT DOCUMENTS

| | | | |
|---|---|---|---|
| EP | 1 816 758 A2 | 8/2007 | |
| EP | 1 863 192 A1 | 12/2007 | |
| EP | 1 865 619 A1 | 12/2007 | |
| WO | WO 2006/007148 A1 | 1/2006 | |
| WO | WO 2006/018689 A1 | 2/2006 | |
| WO | WO 2006/029261 A1 | 3/2006 | |
| WO | WO 2006/031485 A1 | 3/2006 | |
| WO | WO 2006/052502 A2 | 5/2006 | |
| WO | WO 2006/076213 A1 | 7/2006 | |
| WO | WO 2007/022330 A2 | 2/2007 | |
| WO | WO 2007/092539 A2 | 8/2007 | |
| WO | WO 2007/095305 A1 | 8/2007 | |
| WO | WO 2007/102760 A1 | 9/2007 | |
| WO | WO 2007/114654 A1 | 10/2007 | |
| WO | WO 2007/137280 A2 | 11/2007 | |
| WO | WO 2008/009157 A1 | 1/2008 | |
| WO | WO 2008/011451 A2 | 1/2008 | |
| WO | WO 2008/022132 A2 | 2/2008 | |
| WO | WO 2008/037317 A1 | 4/2008 | |
| WO | WO 2008/054140 A1 | 5/2008 | |

OTHER PUBLICATIONS

Love, David J., et al., "What is the value of limited feedback for MIMO channels?" IEEE Comms. Mag., vol. 42, No. 10, pp. 54-59, (Oct. 2004).
Lo, Titus K.Y., "Maximum ratio transmission," IEEE Trans. Commun., vol. 47, No. 7, pp. 1456-1467, (Jul. 1999).
Love, David J., et al., "Grassmannian Beamforming for multiple-input multiple-output wireless systems," IEEE Trans. Inform. Theory, vol. 49, No. 10, pp. 2735-2745, (Oct. 2003).
Love, David J., et al., "Equal gain transmission in multiple-input multiple-output wireless systems," IEEE Trans. Commun., vol. 51, No. 7, pp. 1102-1110, (Jul. 2003).
Roh, June Chul, et al.,"Vector quantization techniques for multiple-antenna channel information feedback," in Proc. Int. Conf. on Signal Process. and Commun. (SPCOM), Bangalore, India, pp. 402-406, (Dec. 2004).
Murthy, Chandra R., et al., "A vector quantization based approach for equal gain transmission," in Proc. IEEE Global Commun. Conf. (Globecom), St. Louis, MO, USA, pp. 2528-2533 (Nov. 2005).
Xia, Pengfei, et al., "Achieving the Welch Bound With Difference Sets," IEEE Trans. Inform. Theory, vol. 51, pp. 1900-1907, (May 2005).
Santipach, Wiroonsak, et al., "Signature optimization for CDMA with limited feedback," IEEE Trans. Inform. Theory, vol. 51, No. 10, pp. 3475-3492, (Oct. 2005).
Dai, Wei, et al., "Quantization bounds on Grassmann manifolds and applications to MIMO communications," submitted to IEEE Transactions on Information Theory, (2005).
Mukkavilli, Krishna Kiran, et al., "On beamforming with finite rate feedback in multiple antenna systems," IEEE Trans. Inform. Theory, vol. 49, No. 10, pp. 2562-2579, (Oct. 2003).
Huang, Kaibin, et al., "Multi-antenna limited feedback for temporally-correlated channels: Feedback COmpression," in Proc. IEEE Global Commun. Conf. (Globecom), San Francisco, CA, USA, (Nov. 2006).
Gray, Robert M., "Quantization," IEEE Trans. Inform. Theory, vol. 44, No. 6, pp. 2325-2383, (Oct. 1998).
Gersho, Allen, et al., "Vector quantization and signal compression," Boston: Kluwer Academic Publishers, Ch. 12, pp. 441-451, (1992).
Ryan, Daniel, J., et al., "QAM codebooks for low-complexity limited feedback MIMO beamforming," IEEE Trans. Commun., to appear, (2008).
Ryan, Daniel J., et al., "GLRT-optimal noncoherent lattice decoding," IEEE Trans. Signal Process., vol. 55, No. 7, pp. 3773-3786, (Jul. 2007).
Mackenthun, Jr., Kenneth, M., "A fast algorithm for multiple-symbol differential detection of MPSK," IEEE Trans. Commun., vol. 42, No. 2/3/4, pp. 1471-1474, (Feb./Mar./Apr. 1994).
Valin, Jean-Marc, et al., "A high-quality speech and audio codec with less than 10 ms delay," submitted to IEEE Transactions on ???, (2008).
Ryan, Daniel J., "Blind detection of PAM and QAM in fading channels," IEEE Trans. Inform. Theory, vol. 52, No. 3, pp. 1197-1206, (Mar. 2006).
Motedayenen-Aval, Idin, et al., "Polynomial-complexity noncoherent symbol-by-symbol detection with application to adaptive iterative decoding of turbo-like codes," IEEE Trans. Commun., vol. 51, No. 2, pp. 197-207, (Feb. 2003).
McKilliam, Robby G., et al., "An improved algorithm for optimal noncoherent QAM detection," in Proc. IEEE Australian Commun. Theory Workshop (AusCTW), Christchurch, New Zealand, pp. 64-68, (Feb. 2008).
Au-Yeung, Chun Kin, et al., "On the performance of random vector quantization limited feedback beamforming in a MISO system," IEEE Trans. Wireless Commun., vol. 6, No. 2, pp. 458-462 (Feb. 2007).
Loeliger, Hans-Andrea, et al., "Averaging bounds for lattices and linear codes," IEEE Trans. Inform. Theory, vol. 43, No. 6, pp. 1767-1773, (Nov. 1997).
Ryan, Daniel J., et al., "QAM Codebooks for Low-Complexity Limited Feedback MIMO Beamforming", in the Proc. of the IEEE Int. Conf. on Communications (ICC), Wireless Communications Symposium, Glasgow, UK, pp. 4162-4167, (Jun. 2007).
Fischer, Thomas R., "A Pyramid Vector Quantizer", IEEE Transactions on Information Theory, vol. it-32, pp. 568-583, (Jul. 1986).
Conway, John H., et al., "A Fast Encoding Method for Lattice Codes and Quantizers," IEEE Transactions on Information Theory., vol. IT-29, No. 6, pp. 820-823, (Nov. 1983).
"Grassmannian Subspace Packing," http://cobweb.ecn.purdue.edu/.../qrass.html (one page) (Jul. 27, 2010).

\* cited by examiner

VECTOR QUANTIZATION IN WIRELESS COMMUNICATION

TECHNICAL FIELD

The present invention relates generally to wireless communication and, in particular, to vector quantization for limited feedback from receiver to transmitter.

BACKGROUND

Multiple-input multiple-output (MIMO) systems can provide increased reliability in wireless communication links by exploiting the spatial diversity due to the increased number of transmit-receive paths. A simple technique to obtain the highest possible diversity order is to employ transmit beamforming and receive combining, which also improves the array gain. This technique requires that the transmitter has channel state information in the form of a transmit beamforming vector. It is often impractical to have a full reciprocal channel from receiver to transmitter to enable the transmitter to estimate the forward channel state information. Instead, the receiver estimates the channel state information, computes the corresponding beamforming vector, and encodes the beamforming vector in a small number of bits. These bits are sent via a feedback path to enable the transmitter to generate the beamforming vector. Such systems are known as limited feedback systems.

The most straightforward approach to designing a limited feedback system is to employ scalar quantization, where each component of the beamforming vector is quantized and encoded separately. In more advanced limited feedback systems, the transmitter and receiver share a codebook of possible beamforming vectors indexed by a number of bits. The receiver chooses a beamforming vector from the codebook on the basis of maximizing the effective signal-to-noise ratio (SNR) after combining, and sends the corresponding bits to the transmitter.

Beamforming vector codebooks are conventionally designed using the minimum number of feedback bits possible for a given effective SNR after combining, i.e. neglecting the search and storage requirements for the codebook. Codebook design strategies generally use numerical optimization techniques, or for larger systems, the codebooks can be randomly generated (i.e. random vector quantization, or RVQ). Such random codebooks have been shown to be asymptotically optimal as the number of bits and transmit antennas increase.

Unfortunately, the codebook size increases exponentially with the number of transmit antennas to maintain a given effective SNR or capacity loss with respect to the optimal unquantized system. Since RVQ codebooks have no structure, an exhaustive search is usually required to find the bits encoding a given beamforming vector, or vice versa. For time-varying channels, the resulting delay due to the excessive search time reduces the effectiveness of the beamforming vector when employed at the transmitter. The computation required for such an exhaustive search also consumes power, which is undesirable for low-power mobile wireless devices. Non-exhaustive methods for searching unstructured codebooks at the expense of increased memory requirements have been documented. One of these methods is a tree-search, where storage of the tree and codebook is required. An additional consequence of the exponential growth in codebook size with antenna number is that storage of the codebook may be infeasible for large numbers of antennas.

The problem of codebook search time and storage requirements is of particular importance to multiuser systems, where quantization errors increase the interference between users.

SUMMARY

Disclosed are arrangements which seek to ameliorate the disadvantages of existing methods by using Reflected Simplex codebooks in beamforming vector quantization for limited feedback MIMO systems. The disclosed Reflected Simplex codebooks adhere to a geometric construction, consisting of integer coordinates that lie within the original and reflected images about the axes of a ($2N_T-1$)-dimensional simplex, where $N_T$ is the number of transmit antennas. Also disclosed is a method of indexing the Reflected Simplex codebook with low time and storage requirements. Also disclosed is an efficient method of searching through the codebook for the optimal quantized beamforming vector.

According to a first aspect of the present invention, there is provided a method of communicating a complex vector, using one or more index bits, the method comprising: quantizing the complex vector using a codebook, the codebook comprising a plurality of complex vectors mapped from real vectors that lie on a reflected simplex where the simplex is of dimension one less than twice the length of the complex vector; indexing the quantized vector to form the one or more index bits; and transmitting the index bits to the transmitter, thereby communicating the complex vector.

According to a second aspect of the present invention, there is provided a method of wireless communication between a transmitter comprising a plurality of transmit antennas and a receiver over a channel, the method comprising: estimating channel state information for the channel; computing an optimal beamforming vector for the plurality of transmit antennas from the channel state information; quantizing the optimal beamforming vector using a codebook, the codebook comprising a plurality of complex vectors mapped from real vectors that lie on a reflected simplex where the simplex is of dimension one less than twice the length of the optimal beamforming vector; indexing the quantized vector to form one or more index bits; and transmitting the index bits to the transmitter.

According to a third aspect of the present invention, there is provided a receiver for implementing the method according to the second aspect.

According to a fourth aspect of the present invention, there is provided a system for wireless communication over a channel, the system comprising: a transmitter comprising a plurality of transmit antennas; and a receiver adapted to: estimate channel state information for the channel; compute an optimal beamforming vector for the plurality of transmit antennas from the channel state information; quantize the optimal beamforming vector using a codebook, the codebook comprising a plurality of complex vectors mapped from real vectors that lie on a reflected simplex where the simplex is of dimension one less than twice the length of the optimal beamforming vector; index the quantized vector to form one or more index bits; and transmit the index bits to the transmitter.

Other aspects of the invention are also disclosed.

BRIEF DESCRIPTION OF THE DRAWINGS

Embodiments of the present invention are described hereinafter with reference to the drawings, in which.

DETAILED DESCRIPTION

Where reference is made in any one or more of the accompanying drawings to steps and/or features, which have the same reference numerals, those steps and/or features have for the purposes of this description the same function(s) or operation(s), unless the contrary intention appears.

Figure 1:
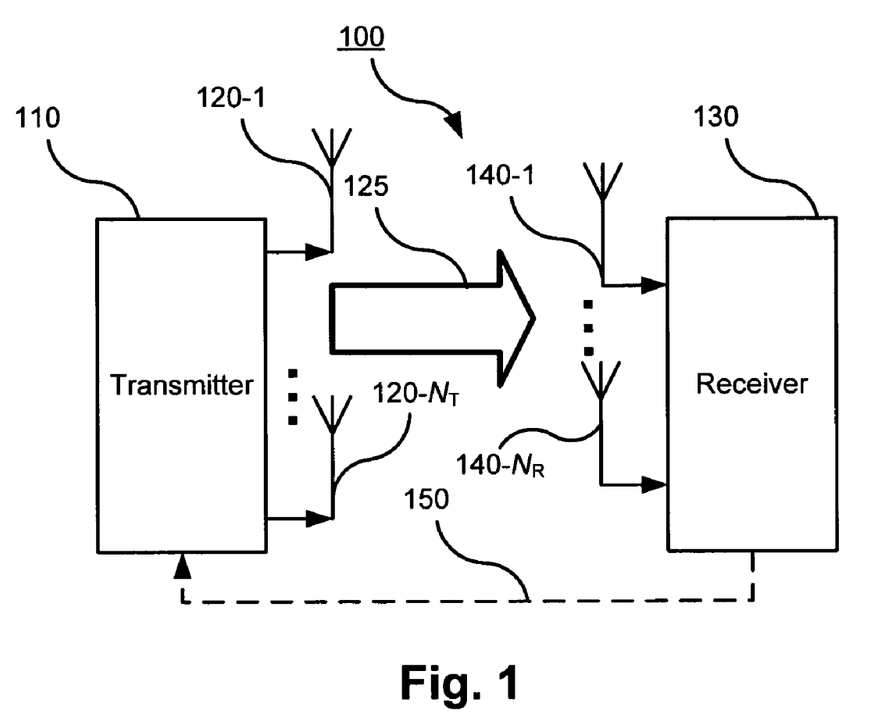
FIG. 1 is a block diagram showing a limited feedback MIMO wireless communication system on which the embodiments of the present invention may be practised.

FIG. 1 is a block diagram showing a limited feedback MIMO wireless communication system 100 on which the embodiments of the present invention may be practiced. The system 100 comprises a transmitter 110, which transmits data symbols wirelessly over a narrow-band channel 125 through $N_T$ transmit antennas 120-1 to 120-$N_T$. The data symbols are received by a receiver 130 through $N_R$ receive antennas 140-1 to 140-$N_R$. The system 100 also comprises a low-rate feedback link 150 (indicated by a broken line) through which the receiver sends state information about the channel 125 to the transmitter 110. The transmitter 110 uses the state information to maximise the performance of the transmission to the receiver 130.

Since the channel 125 is narrow-band, a complex transmitted symbol x is transformed to a complex received symbol y as follows:

$$y = z^T H w x + z^T n, \quad (1)$$

where w is the unit magnitude complex beamforming vector (of length $N_T$) applied at the transmitter 110, H is a $N_R$-by-$N_T$ complex-valued matrix representing the effect of the channel 125, z is the unit magnitude complex combining vector (of length $N_R$) applied at the receiver 130, and n is the complex noise vector (of length $N_R$) at the receiver 130. Assuming the noise is independent, identically distributed (i.i.d), circularly symmetric complex Gaussian with variance $N_0$, the signal-to-noise ratio (SNR) $\rho$ at the receiver 130 is given by:

$$\rho = \frac{E_x \Gamma(H)}{N_0}, \quad (2)$$

where $E_x$ is the average transmitted symbol power and $$\Gamma(H) = |z^T H w|^2 \quad (3)$$

is the effective channel gain.

Given w and H, the (unit magnitude) combining vector z that maximises the received SNR is given by the Maximum Ratio Combining (MRC) formula:

$$z_{MRC} = \frac{Hw}{\|Hw\|}. \quad (4)$$

From equation (3), the resulting effective channel gain (the MRC gain) is:

$$\Gamma_{MRC}(H) = \|Hw\|^2. \quad (5)$$

The optimal infinite-precision (unquantized) beamforming vector $w_{opt}$ that maximises the MRC gain is given by the right-singular unit vector of H corresponding to the largest singular value of H. The beamforming scheme utilising $w_{opt}$ is known as maximum ratio transmission (MRT). The effective channel gain when using MRT and MRC is denoted $\Gamma_{MRT,MRC}(H)$ and is given by the square of the largest singular value of H.

In the limited feedback system 100 of FIG. 1, the receiver 130 and the transmitter 110 share a codebook C of possible beamforming vectors, which are indexed by $\operatorname{ceil}(\log_2(|C|))$ bits. The optimal quantized beamforming vector $\hat{w}_{opt}$ in the codebook C may be computed as:

$$\hat{w}_{opt} = \underset{v \in C}{\operatorname{argmax}} \frac{\|Hv\|^2}{\|v\|^2}. \quad (6)$$

The denominator is present in equation (6) to ensure the average transmitted signal power $E_x$ is constant.

Because in general $\hat{w}_{opt} \neq w_{opt}$, the effective channel gain using $\hat{w}_{opt}$ (computable using equation (5)) is less than the MRC-MRT gain $\Gamma_{MRT,MRC}(H)$, by an amount depending on the granularity or quantization step size of the codebook C. The design of the codebook C is therefore critical for the performance of the system 100.

Figure 3:
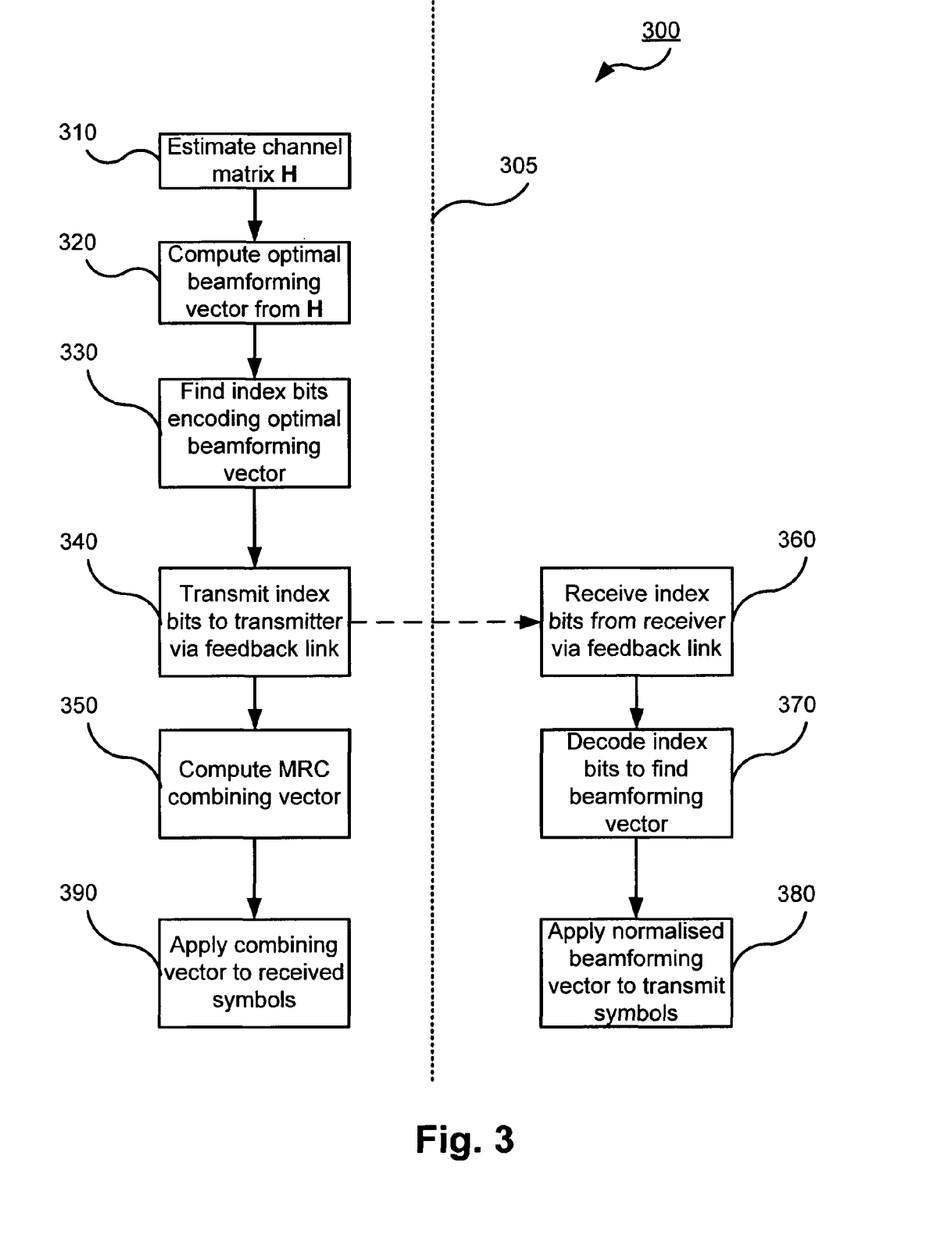
FIG. 3 is a flowchart illustrating a method of limited feedback wireless communication carried out by the system of FIG. 1.

FIG. 3 is a flowchart illustrating a method 300 of limited feedback wireless communication carried out by the system 100 of FIG. 1. The steps on the left of the dotted line 305 are carried out by the receiver 130, while the steps on the right are carried out by the transmitter 110. The method 300 starts at the step 310, where the receiver 130 estimates the channel matrix H using known methods, for example from the characteristics of a known training sequence transmitted by the transmitter 110. In step 320, the receiver 130 computes the optimal (unquantized) beamforming vector $w_{opt}$. This is done using the singular value decomposition of the channel matrix H as described above. In the next step 330, the receiver 130 finds the index bits encoding the optimal beamforming vector $w_{opt}$, as described in more detail below. Step 330 involves quantization of $w_{opt}$ and indexing of the quantized vector. Next, the receiver 130 in step 340 transmits the index bits to the transmitter 110 (indicated in FIG. 3 by the broken line arrow from the receiver side to the transmitter side) over the feedback link 150 of FIG. 1 (which is assumed to be error-free). At step 350 the receiver 130 computes the (unit magnitude) MRC combining vector $z_{MRC}$ from the channel H and the optimal quantized beamforming vector using equation (4). Meanwhile, the transmitter 110 receives at step 360 the index bits from the receiver 130 over the feedback link 150. In step 370, the transmitter 110 decodes the index bits to find the optimal quantized beamforming vector, which the transmitter 110 normalises to unit magnitude. In steps 380 and 390, the transmitter 110 and the receiver 130 apply the normalised beamforming vector and the combining vector $z_{MRC}$ to transmitted and received data symbols respectively.

The channel 125 could be one of the subchannels in a wideband (e.g. Orthogonal Frequency Division Multiplexing, or OFDM) system, such as 3G LTE and 802.11a/g WLAN. In such a case, the method 300 could be performed independently for each subchannel of the OFDM channel, or could be performed for only a subset of the OFDM subchannels, and the resulting beamforming and combining vectors could be used to transmit and receive symbols in the respective neighbouring OFDM subchannels.

Design of the Reflected Simplex Codebook

One known codebook uses square lattice angular quantization (SLAQ) to reduce both the search and storage complexity of limited feedback MIMO systems. In SLAQ, the components of codebook vectors are complex integers and can be considered as points of a Quadrature Amplitude Modulation (QAM) constellation. As in QAM, SLAQ codebooks have simple bit-to-symbol indexing algorithms, so codebook storage is not required at either the transmitter or receiver. The problem of searching SLAQ codebooks to estimate the optimal quantized beamforming vector is similar to the problem of noncoherent sequence detection, and fast non-coherent sequence detection algorithms can be utilized to achieve reduction in search complexity orders of magnitude smaller than an exhaustive search. Significantly, the SNR performance of SLAQ codebooks is similar to that of conventional (RVQ) codebooks for the same number of feedback bits, but with much lower computational complexity.

Like SLAQ codebooks, Reflected Simplex codebooks adhere to a geometrically regular construction. Reflected Simplex codebook construction is based on a codebook known as Pyramid Vector Quantization (PVQ) that has been used in the context of audio quantization, as part of a very low-delay high-quality speech and audio codec. A Reflected Simplex codebook consists of complex integer vectors mapped from real integer vectors that lie on the original and reflected images about the axes of a ($2N_T-1$)-dimensional simplex. Reflected Simplex codebooks can be indexed with low time and storage requirements and efficiently searched to estimate the optimal quantized beamforming vector, as described below.

A PVQ codebook D(N,K) consists of real integer vectors of length N, where K is a parameter that determines the granularity or coarseness of the quantization. The PVQ codebook D(N,K) is constructed from a base set of all real integer vectors that lie on a segment of the hyperplane $\{Ke_1; \ldots; Ke_N\}$ that is bounded by the convex hull of the vectors $Ke_i$ (the vectors $e_i$ are the columns of the N by N identity matrix $I_N$). The hyperplane segment is an (N−1)-simplex. The parameter K is the height of the simplex, and the length of its edges is K$\sqrt{2}$. Note that a 1-simplex is a line segment, a 2-simplex is an equilateral triangle, and a 3-simplex is a regular tetrahedron.

More precisely, the base set is defined by:

$$\left\{ v \in Z^N : \sum_{t=1}^{N} v_t = K, v_t \geq 0 \right\}. \quad (7)$$

In addition, the codebook D(N,K) contains all of the $2^N-1$ images obtained by reflecting the set (7) about the N axes of $R^N$. The codebook D(N,K) is therefore defined by $$D(N, K) = \left\{ v \in Z^N : \sum_{t=1}^{N} |v_t| = K \right\} \quad (8)$$

Figure 2:
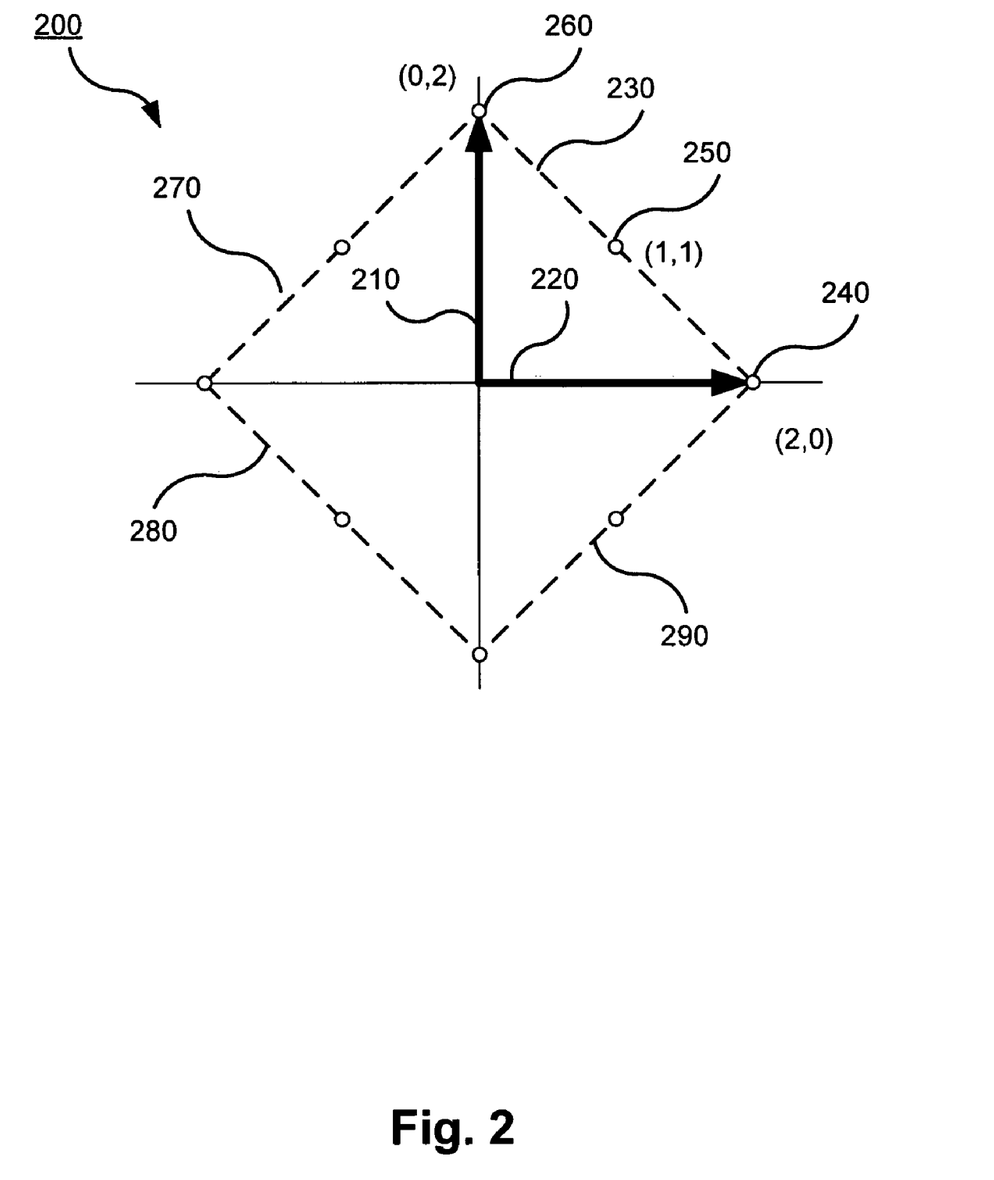
FIG. 2 is a plot of the vectors in the PVQ codebook D(2, 2)

FIG. 2 is a plot 200 of the vectors in the PVQ codebook D(N,K), with N=2 and K=2. The vectors 210 and 220 are the vectors $Ke_1$ and $Ke_2$. The hyperplane segment 230 is the 1-simplex. The points (2, 0) 240, (1, 1) 250, and (0, 2) 260 make up the base set (7). The reflections 270, 280, and 290 of the base set $\{(2,0),(1,1),(0,2)\}$ about the two axes complete the PVQ codebook D(2, 2).

The number of codewords (vectors) in the codebook D(N, K) is denoted as V(N,K). It can be shown that:

$$V(N, K) = \sum_{L=0}^{min(N,K)} 2^L \binom{N}{L}\binom{K-1}{L-1}, \quad (9)$$
$$= 2N {}_2F_1(1-K, 1-N; 2; 2)$$

where ${}_2F_1$ is Gauss' hypergeometric function. V(N,K) can also be computed using the following recurrence relation:

$$V(N,K)=V(N,K-1)+V(K,N-1)+V(N-1,K-1) \quad (10)$$

with V(1,K)=2 for all K and V(N,1)=2N. The recurrence relation of equation (10) provides a O(NK) method for computationally efficient calculation of V(N,K) by storing the intermediate values in matrix form, avoiding the multiplications or the complexity of evaluating the hypergeometric function in equation (9). The total number of bits required to transmit a vector in the PVQ codebook is given by ceil($\log_2$(V(N,K))).

For the case of low-rate quantization, i.e. N>>K, it can be shown that $$\log_2 V(N,K) \to K \log_2(2N) - \log_2 K!, \quad (11)$$

while for the case of high-rate quantization, i.e. K>>N, $$\log_2 V(N,K) \to (N-1)\log_2(2(K-1))+1-\log_2(N-1)!. \quad (12)$$

More generally, $$\log_2 V(N,K) \approx (N-1)\log_2(2(K-1))-\log_2(N-1)!. \quad (13)$$

In what follows, the underline notation denotes a bidirectional mapping between a complex vector u of length $N_T$ and a real-valued vector $\underline{u}$ of length N=2 $N_T$ defined as follows:

$$\underline{u}_{2t-1}=\Re\{u_t\}, \underline{u}_{2t}=\Im\{u_t\}, t=1, \ldots, N_T \quad (14)$$

The PVQ codebook is modified to form the Reflected Simplex codebook as follows. First, construct a modified PVQ codebook $C_R(N_T, K)$ of real integer vectors from the PVQ codebook D(N,K) as follows:

$$C_R(N_T,K)=\{\underline{v} \in D(N,K), \underline{v}_{2r-1}>0, \underline{v}_{2r} \geq 0\}, \quad (15)$$

where r=ceil(l/2), and l is the index of the first nonzero component of $\underline{v}$.

A Reflected Simplex codebook $C(N_T, K)$ is constructed as complex vectors of length $N_T$, derived from the real vectors in $C_R(N_T, K)$ using the mapping in equation (14):

$$C(N_T,K)=\{v:\underline{v} \in C_R(N_T,K)\}. \quad (16)$$

The effect of the condition $\underline{v}_{2r-1}>0, \underline{v}_{2r} \geq 0$ in the definition of $C_R(N_T, K)$ (equation (15)) is to remove from $C(N_T, K)$ complex vectors that are phase ambiguous. For example, the effect of the condition on $C_R(1, 2)$ is to leave only the first quadrant vectors in D(2,2), namely (2,0) and (1,1) (see FIG.

2). Two complex vectors $v_1$, $v_2$ are phase ambiguous if there exists a complex scalar $\gamma$ of unit modulus such that $v_1=\gamma v_2$. This relation implies that the channel gain (see equation (5)) is the same for both vectors, so one of the vectors is redundant.

If the condition $v_{2r-1}>0, v_{2r} \geq 0$ were not applied to modify the PVQ codebook, for every $v$ in the Reflected Simplex codebook, there would also be three phase ambiguous vectors $-v$, $jv$ and $-jv$. On removing these redundant vectors, the size of the Reflected Simplex codebook becomes $V(N, K)/4$, and thus the number of bits required to encode the Reflected Simplex codebook is $\text{ceil}(\log_2(V(N,K)))-2$. This saving of 2 feedback bits is a significant amount for small codebooks suited to limited feedback beamforming.

Figure 7:
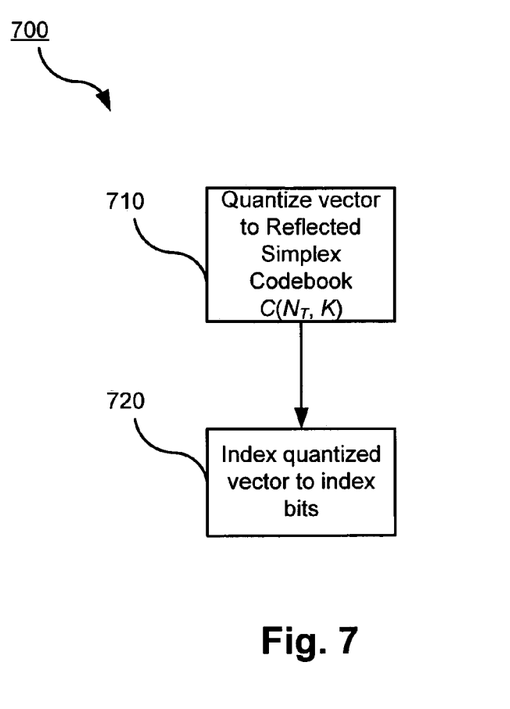
FIG. 7 is a flowchart illustrating a method of encoding a real vector to index bits, as used in the method of FIG. 3.

FIG. 7 is a flowchart illustrating a method 700 of encoding a real vector of length N to index bits. The method 700 is used at step 330 of the method 300, with its input vector being the real-valued mapping $w_{opt}$ according to (14) of the optimal beamforming vector $\bar{w}_{opt}$ computed at step 320. The method 700 starts at step 710 where the input vector is quantized to the Reflected Simplex codebook $C(N_T, K)$, where $N_T$ is N/2, i.e. half the length of the real input vector, and K is the granularity parameter. The step 710, described in more detail below, may alternatively be termed locating the quantized version of an input vector in the Reflected Simplex codebook $C(N_T, K)$. The result is a complex vector from the codebook $C(N_T, K)$. At the next step 720, the method 700 indexes the complex codebook vector to obtain one or more index bits as described in detail below. The method 700 then concludes.

Indexing the Reflected Simplex Codebook

Figure 4:
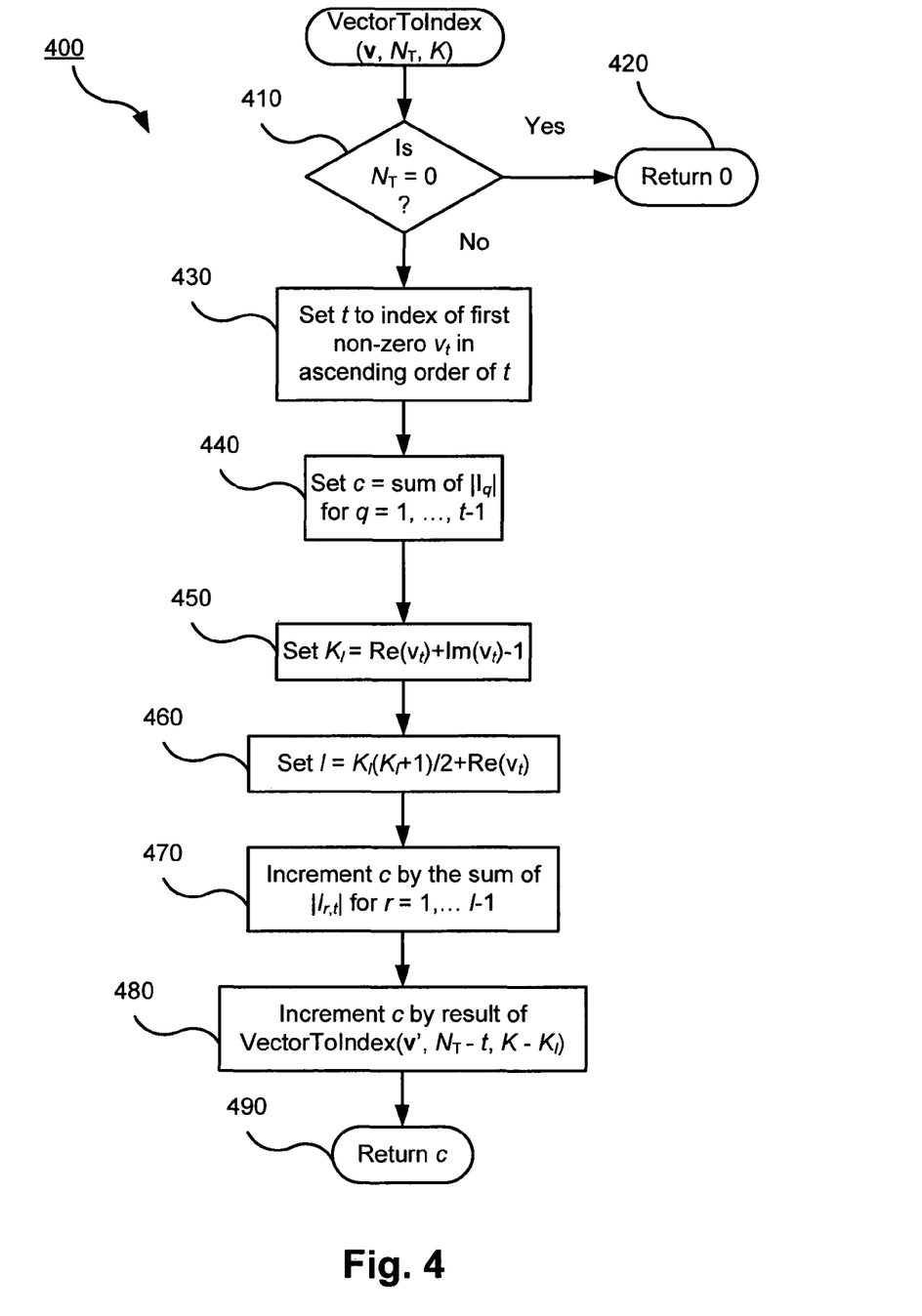
FIG. 4 is a flowchart illustrating a method of obtaining an index for a complex vector in the Reflected Simplex codebook, as used in the method of FIG. 3.

FIG. 4 is a flowchart illustrates a method 400 of obtaining an index for a complex vector v in the Reflected Simplex codebook $C(N_T, K)$, carried out by the receiver 130 at step 720 of the method 700 of FIG. 7 when invoked at step 330 of the method 300 of FIG. 3. The indexing method 400 is based on the indexing of the PVQ codebook D(N,K), and has a complexity of O(NK), mostly avoiding multiplications and divisions (although some operations involve division or multiplication by two, which can be implemented using less complex bit shift operations).

Figure 5:
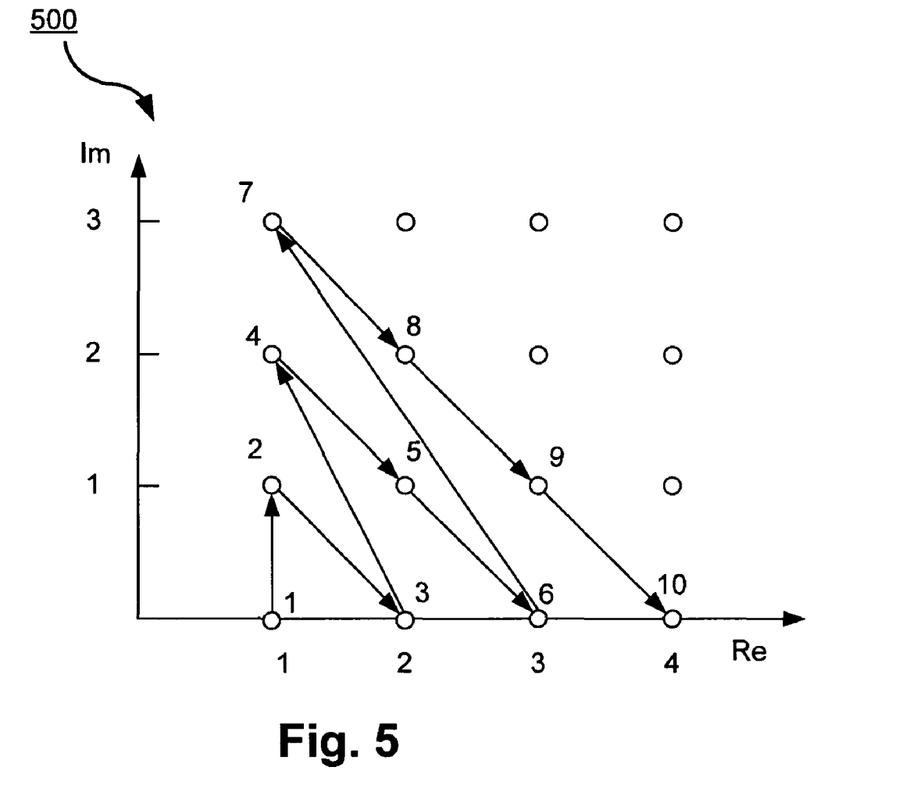
FIG. 5 is a plot illustrating the zigzag ordering of complex values used in the indexing method of FIG. 4.

The method 400 begins at decision step 410 where a check is made to determine whether $N_T=0$. If so (Yes), the method 400 at step 420 returns an index of zero. If not (No), the method 400 proceeds to step 430, where the components $v_t$ of v are examined in order of ascending t. The value of t is set to the index of the first non-zero component $v_t$. The value of t indexes a disjoint partition $I_t$ of the codebook $C(N_T, K)$ in which v lies. The partition $I_t$ is in turn made up of K(K+1)/2 disjoint subsets $I_{r,t}$, where all the vectors v in $I_{r,t}$ have the same, unique (non-zero) value of $v_t$, namely $v_r$. The subsets $I_{r,t}$ of $I_t$ are ordered according to their common $v_t$ values according to the zigzag pattern illustrated in FIG. 5. That is, $I_{1,t}$ contains all the vectors v in $I_t$ with $v_t=1+0j$, while $I_{2,t}$ contains all the vectors v in $I_t$ with $v_t=1+1j$, and so on.

The size of the subset $I_{r,t}$ is given by $$|I_{r,t}| = V\left(2(N_T - t + 1), K - \left\lceil \frac{1}{2}\sqrt{8r+1} - 1 \right\rceil\right). \quad (17)$$

At step 440 the index c is set to the sum of the sizes of each partition $I_q$ for q=1, ... t-1, which is given by:

$$c = \sum_{q=1}^{t-1} |I_q| = \sum_{q=1}^{t-1} \sum_{r=1}^{K(K+1)/2} |I_{r,t}|. \quad (18)$$

To identify the ordinate l of the subset $I_{l,t}$ of $I_t$ within which v lies, the method 400 at step 450 sets $$K_l = \Re(v_t) + \Im(v_t) - 1. \quad (19)$$

The method 400 at step 460 then sets l to:

$$l = \frac{K_l(K_l + 1)}{2} + \Re(v_t). \quad (20)$$

In step 470, the method 400 increments the index c by the sum of the sizes of each subset $I_{r,t}$ for r=1 to l-1 using equation (17) for $|I_{r,t}|$. In step 480, the method 400 increments the index c. This is done by recursively invoking the method 400 on the new vector v' that is obtained from v by removing the components $v_q$ for q=1 to t, also reducing $N_T$ by t and K by $K_l$, and adding the result to the index c. The method 400 returns the value of c at step 490.

The method for decoding the index bits to a beamforming vector in $C(N_T, K)$, carried out by the transmitter 110 in the step 370 of the method 300 is a straightforward inversion of the indexing method 400. The resulting decoding method also has a complexity of O(NK).

Another form of redundancy arises in the Reflected Simplex codebook between a pair of codebook vectors related by $v_1=\gamma v_2$ for $|\gamma| \neq 1$, referred to as a divisor ambiguity. Beamforming vectors with divisor ambiguity yield the same effective channel gain (equation (5)) after normalisation to unit magnitude. For example, if $N=2N_T=4$ and K=4, the vectors [2+j0 2+j0] and [1+j1 1+j1] exhibit divisor ambiguity, with $\gamma=1-j$. The simplex-based domain of the PVQ codebook allows calculation of the number of redundant vectors in the Reflected Simplex codebook due to divisor ambiguities. First, divisor ambiguities only occur if K is even. Secondly, if K is even, divisor ambiguity only occurs when $\gamma=\pm1\pm j$, $\mu_t=\pm a \pm ja$; and $v_t=\pm 2a \pm j2a$ for all t=1, ... N. Finally, the number of redundant vectors due to divisor ambiguity is upper bounded by $$\sum_{L=0}^{\min(N_T, K/2)} 4^L \binom{N_T}{L} \binom{\frac{K}{2} - 1}{L - 1}. \quad (21)$$

This formula may be applied to calculate the number of bits required to index the Reflected Simplex codebook with divisor ambiguities removed. For a large range of N and K, there is no (N, K) pair where removing divisor ambiguities would reduce the integer number of bits. However, for some small K values, a small fraction of a bit is saved, which may provide some efficiencies when a number of vectors are encoded together. A consequence would be more complex index encoding and decoding methods than those described above with reference to FIG. 4, but for small codebooks a lookup table may be used rather than indexing methods.

Searching the Reflected Simplex Codebook

The method performed by the receiver 130 in step 710 of the method 700, when invoked at step 330 of the method 300, to locate the optimal quantized beamforming vector in the Reflected Simplex codebook is described hereinafter. A simple exhaustive search over the entire Reflected Simplex codebook can be carried out as in equation (6), but this is prohibitively expensive in terms of computation. Instead, the locating is performed with complexity $O(N_T \log N_T)$ by observing an equivalence with noncoherent sequence detection.

For the case $N_R \leq 2$, the exhaustive codebook search of equation (6) is equivalent to finding the closest codebook vector in angle to the optimal unquantized beamforming vector $w_{opt}$:

$$\hat{w}_{opt} = \underset{v \in C(N_T, K)}{\operatorname{argmax}} \cos^2 \vartheta(v, w_{opt}), \quad (22)$$

where $$\cos^2 \vartheta(v, u) = \frac{|v^T u|^2}{\|v\|^2 \|u\|^2},$$

When $N_R > 2$, equation (22) is also a good first-order approximation. Equation (22) is denoted singular vector quantization (SVQ), because equation (22) is equivalent to quantizing $w_{opt}$ (the right-singular unit vector associated with the largest singular value of the channel matrix H) using an angular metric.

An equivalence relationship exists between SVQ using an angular metric (equation (22)) and the problem of sequence detection over unknown deterministic flat-fading channels. The equivalence can be seen by noting that equation (22) is equivalent to noncoherent detection using the generalized likelihood ratio test (GLRT). Specifically, consider the detection of a complex input vector x, drawn in an i.i.d. manner from a discrete constellation X, given an output vector y:

$$y = hx + n, \quad (23)$$

where n is a vector of i.i.d. white Gaussian noise and h is an unknown complex channel parameter assumed constant over the period of the input vector x. The GLRT-optimal estimate $\hat{x}^{GLRT}$ of the input vector x is obtained from the received data y by solving $$\hat{x}^{GLRT} = \underset{x \in X}{\operatorname{argmin}} \min_h \|y - hx\|^2, \quad (24)$$

which becomes, on setting $\lambda = h^{-1}$, $$\hat{x}^{GLRT} = \underset{x \in X}{\operatorname{argmin}} \min_\lambda \frac{1}{|\lambda|^2} \|\lambda y - x\|^2. \quad (25)$$

Algorithms are known for computing $\hat{x}^{GLRT}$ according to equation (25) for any $\lambda$ over specific constellations X efficiently, i.e. in polynomial time.

To show the equivalence to equation (22), consider the real-valued mapping $\underline{w}_{opt}$ according to (14) of the optimal beamforming vector $\overline{w}_{opt}$. Denote z as the vector in the direction of $\underline{w}_{opt}$ such that the sum of the absolute values of the components of $\underline{z}$ is K, i.e.

$$\underline{z} = \frac{K \underline{w}_{opt}}{\sum_{n=1}^{N} |w_n^{opt}|}. \quad (26)$$

In other words, $\underline{z}$ is the projection of $\underline{w}_{opt}$ onto the reflected simplex that is the domain of $\overline{C}_R(N_T, K)$.

Instead of performing the SVQ of equation (22), the following equivalent search is performed:

$$\hat{\underline{w}}_{opt} = \underset{\underline{v} \in C_R(N, K)}{\operatorname{argmin}} \|\underline{z} - \underline{v}\|^2, \quad (27)$$

which in turn is equivalent to the GLRT estimation of equation (25), with $$\lambda = \frac{K}{\sum_{n=1}^{N} |w_n^{opt}|}$$

and $X = C_R(N_T, K)$.

Without loss of generality, all the components of $\underline{z}$ may be converted to be non-negative. That is, assign $$\underline{z}_+ = \underline{s} \circ \underline{z} \quad (28)$$

where $s_n = \operatorname{sgn}(z_n)$ for all n and $\circ$ denotes the Hadamard product. In other words, $\underline{z}_+$ is the reflection of $\underline{z}$ onto the simplex on which $C_R(N_T, K)$ is based, i.e. the hyperplane segment defined by $$\left\{ \underline{u} : \sum_{n=1}^{N} u_n = K, \quad u_n \geq 0 \right\}.$$

All the codebook vectors in $C_R(N_T, K)$ with non-negative components exist on this simplex. The non-negative portion of the codebook $C_R(N_T, K)$ is a subset of a translated $A_{N-1}$ lattice, which is defined as:

$$A_{N-1} = \left\{ \underline{a} : \underline{a} \in Z^N, \quad \sum_{n=1}^{N} a_n = 0 \right\}.$$

In other words, if $\underline{v} \in C_R(N, K)$, then $\underline{v}_+ - Ke_1 \in A_{N-1}$. The codebook search of equation (27) is therefore equivalent to $$\hat{\underline{w}}_{opt} = \underline{s} \circ \underset{\underline{a} \in A_{N-1}}{\operatorname{argmin}} \|(\underline{z}_+ - Ke_1) - \underline{a}\|^2 + Ke_1. \quad (29)$$

Equation (29) corresponds to a search for the closest point in Euclidean distance to the vector $\underline{z}_+ - Ke_1$ over the lattice $A_{N-1}$. A method described below with a complexity of $O(N \log N)$ for performing the search of equation (29) over the lattice $A_{N-1}$ is used. The resulting real vector $\hat{\underline{w}}_{opt}$ is mapped using equation (14) to become the optimal quantized beamforming vector $\hat{w}_{opt}$.

Figure 6:
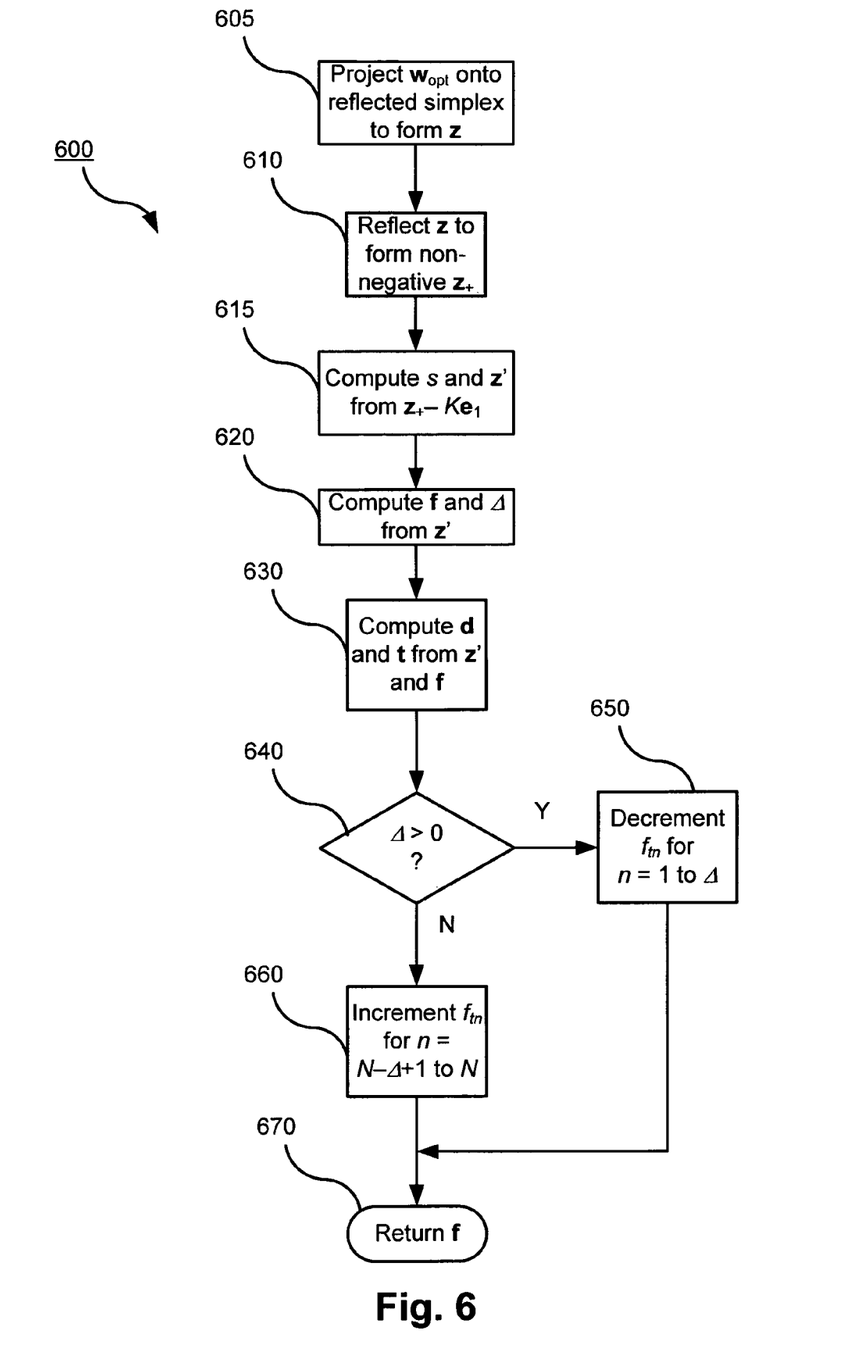
FIG. 6 is a flowchart illustrating a method of searching the Reflected Simplex codebook, as used in the method of FIG. 7.

FIG. 6 is a flowchart illustrating a method 600 of searching the Reflected Simplex codebook to locate the optimal quantized beamforming vector from the optimal beamforming vector $w_{opt}$, as used in step 710 of the method 700 of FIG. 7 when invoked at step 330 of the method 300 of FIG. 3. The method 600 begins at step 605, where the real vector $\underline{w}_{opt}$ is projected onto the reflected simplex using equation (26) to form a projection $\underline{z}$. At step 610, the projection $\underline{z}$ is reflected onto the non-negative portion of the reflected simplex using equation (28) to form the vector $z_+$. At the next step 615, the sum s of the components of $z_+ - \bar{K}e_1$ is computed, and a new vector $\underline{z}'$ is computed as:

$$z' = (z_+ - Ke_1) - \frac{s}{N}[1 \ \ldots \ 1]^T \quad (30)$$

At the next step 620, the vector z' is rounded to the integer vector f, and the components of $\bar{f}$ are summed to form the integer variable Δ. At the following step 630, the method 600 computes the difference vector d between z' and its rounded version f. A vector t of indices in the range $\{1, \ldots N\}$ is then formed from d such that $t_n$ is the index of the n-th most positive component of d.

The method 600 then at step 640 determines whether Δ>0. If so, step 650 decrements by 1 all the components of f indexed by $t_n$, for n=1 to Δ. (These are the indices of the $\bar{\Delta}$ most positive differences between z' and its integer rounded version f.) If not, step 660 increments by 1 all the components of f indexed by $t_n$, for n=N+Δ+1 to N. (These are the indices of the −Δ most negative differences between z' and its integer rounded version f.) After both steps 650 and 660, the method 600 returns the complex mapping f of the updated vector $\underline{f}$ at step 670.

An alternative embodiment of step 710 is to perform the method 600 a number (L) of times for different rotations of the vector $w_{opt}$. The values of the rotations correspond to phase rotations uniformly spaced between 0 and π/2. This is achieved by performing the method 600 L times, on $w_{opt}^l$, for l=0, ... L−1, where:

$$w_{opt}^l = w_{opt} \exp\left(\frac{j\pi l}{2L}\right), \quad (31)$$

The result is L candidate beamforming vectors $\hat{w}_{opt}^l$. The candidate beamforming vector that maximises the metric in equation (6) is then chosen for indexing.

In addition to its application in beamforming for MIMO systems, the encoding method 700 may also be applied to any system where a vector needs to be efficiently encoded in a low number of bits. The method 700, for a general input vector, may include the preliminary step of normalizing the vector to be of unit magnitude. The scaling factor is scalar quantized and encoded separately. If the input vector is complex, the mapping of equation (14) should be applied first.

Particular examples include point-to-point precoding such as unitary, linear, and SVD precoding for MIMO systems, where the rows or columns of the channel matrix or precoding matrix need to be sent to the transmitter. Other example systems include multi-user precoding such as zero forcing beamforming and vector perturbation precoding, where the channel vectors for each user need to be sent to the transmitter.

The transmitter 110 and receiver 130 are preferably implemented in dedicated hardware or modules such as embedded integrated circuits performing the functions or sub functions of FIGS. 3, 4, 6, and 7, e.g. a PHY/MAC layer chip, or part of a transmitter or receiver chip. The receiver could be a 3G or 4G cellular handset or enabled PC, or a WLAN enabled handset or PC. Such modules may also comprise graphic processors, digital signal processors, or microprocessors and associated memories.

The arrangements described are applicable to the wireless communication industries.

The foregoing describes only some embodiments of the present invention, and modifications and/or changes can be made thereto without departing from the scope and spirit of the invention, the embodiments being illustrative and not restrictive.

The invention claimed is:

1. A method of communicating a complex vector, the method comprising:
   quantizing said complex vector using a codebook, said codebook comprising a plurality of complex vectors mapped from real vectors that lie on a reflected simplex where the simplex is of dimension one less than twice the length of said complex vector;
   indexing said quantized vector to form one or more index bits; and
   transmitting said index bits, thereby communicating said complex vector.

2. The method of claim 1, wherein said complex vectors in said codebook have no phase ambiguity.

3. The method of claim 2, wherein said complex vectors in said codebook have no divisor ambiguity.

4. The method of claim 1, wherein said quantizing comprises:
   mapping said complex vector to a real vector;
   projecting said real vector onto said reflected simplex;
   searching over an $A_{N-1}$ lattice to estimate a lattice vector that minimises a Euclidean distance from said projected vector; and
   de-mapping said lattice vector to a complex quantized vector.

5. The method of claim 4, wherein said quantizing further comprises:
   applying an offset equal to a granularity parameter of said codebook to said projected vector before said searching; and
   applying said offset to said lattice vector before said de-mapping.

6. The method of claim 4, wherein said quantizing further comprises
   applying a rotation to said complex vector;
   repeating said mapping, projecting, searching, and de-mapping on said rotated complex vector to obtain a candidate complex quantized vector; and
   choosing between said candidate complex quantized vector and said complex quantized vector according to a predetermined metric.

7. The method of claim 1, wherein said indexing comprises:
   locating a partition of said codebook in which said quantized vector lies;
   setting an index to the sum of the sizes of partitions of said codebook preceding said located partition;
   identifying a subset of said located partition in which said quantized vector lies;
   incrementing said index by the sum of the sizes of subsets of said located partition preceding said identified subset;
   obtaining a new vector by removing leading zero components from said quantized vector; and
   incrementing said index by the result of said indexing on said new vector.

8. The method of claim 1, wherein said complex vector is an optimal beamforming vector adapted to be used at the transmitter of a multiple-input wireless communication system.

9. The method of claim 8, further comprising:
   estimating channel state information for said wireless communication system; and computing said optimal beamforming vector from said channel state information.

10. A method of wireless communication between a transmitter comprising a plurality of transmit antennas and a receiver over a channel, the method comprising:
   estimating channel state information for said channel;
   computing an optimal beamforming vector for said plurality of transmit antennas from said channel state information;
   quantizing said optimal beamforming vector using a codebook, said codebook comprising a plurality of complex vectors mapped from real vectors that lie on a reflected simplex where the simplex is of dimension one less than twice the length of said optimal beamforming vector;
   indexing said quantized vector to form one or more index bits; and
   transmitting said index bits to said transmitter.

11. The method of claim 10, wherein the receiver comprises a plurality of receive antennas, further comprising:
   computing a combining vector from said quantized vector and said channel state information, and
   applying said combining vector to data symbols received from said transmitter on said receive antennas.

12. A receiver adapted to receive wireless communication from a transmitter over a channel, said receiver comprising:
   an estimation module adapted to estimate channel state information for said channel;
   a computation module adapted to compute an optimal beamforming vector for said plurality of transmit antennas from said channel state information;
   a quantization module adapted to quantize said optimal beamforming vector using a codebook, said codebook comprising a plurality of complex vectors mapped from real vectors that lie on a reflected simplex where the simplex is of dimension one less than twice the length of said optimal beamforming vector;
   an indexing module adapted to index said quantized vector to form one or more index bits; and
   a transmit module adapted to transmit said index bits to said transmitter.

13. The receiver of claim 12, further comprising:
   a plurality of receive antennas;
   a computing module adapted to compute a combining vector from said quantized vector and said channel state information, and
   a combining module adapted to apply said combining vector to data symbols received from said transmitter on said receive antennas.

14. A system for wireless communication over a channel, the system comprising:
   a transmitter comprising a plurality of transmit antennas; and
   a receiver adapted to:
      estimate channel state information for said channel;
      compute an optimal beamforming vector for said plurality of transmit antennas from said channel state information;
      quantize said optimal beamforming vector using a codebook, said codebook comprising a plurality of complex vectors mapped from real vectors that lie on a reflected simplex where the simplex is of dimension one less than twice the length of said optimal beamforming vector;
      index said quantized vector to form one or more index bits; and
      transmit said index bits to said transmitter.

15. The system of claim 14, wherein the receiver comprises a plurality of receive antennas and is further adapted to:
   compute a combining vector from said quantized vector and said channel state information, and
   apply said combining vector to data symbols received from said transmitter on said receive antennas.

* * * * *